Sept. 6, 1966   B. A. SHAW   3,271,718
MAGNETIC CORES FOR ELECTRICAL DEVICES AND METHOD OF MANUFACTURE
Filed Aug. 6, 1962

INVENTOR.
BEVERLEY A. SHAW
BY
Weingarten, Orenbuch & Pandiscio
ATTORNEYS

United States Patent Office 3,271,718
Patented Sept. 6, 1966

3,271,718
MAGNETIC CORES FOR ELECTRICAL DEVICES
AND METHOD OF MANUFACTURE
Beverley A. Shaw, North Reading, Mass., assignor to
Tyco Laboratories, Inc., Waltham, Mass., a corporation
of Massachusetts
Filed Aug. 6, 1962, Ser. No. 215,092
20 Claims. (Cl. 336—219)

This invention relates to magnetic cores for electrical devices and more particularly to improved laminated cores and method of manufacture thereof.

Magnetic cores are embodied in a variety of electrical devices, including but not limited to motors, generators, and transformers. These devices are subjected to power losses in their magnetic cores. One of these losses is hysteresis loss; another is eddy current loss. As is well known, eddy currents can be minimized by assembling the magnetic cores from thin metal sheets with an insulating layer between successive laminations. Most commonly, the laminations are insulated from each other by a thin coat of varnish or lacquer, but in some instances simply by the oxidation of their surfaces due to contact with air while the laminations are being annealed. While such construction has found extensive use, it has limitations which have been deemed to render it unsatisfactory for certain applications where severe manufacture and performance requirements have been imposed by recent technological developments. Among their limitations are the following: (1) they cannot withstand heating to elevated temperatures but will exhibit mechanical and/or electrical deterioration, (2) their eddy current losses are excessive for particular installations, or (3) they lock mechanical integrity of a level such that machining or grinding to final dimensions will not cause delamination of the assembled core. To a great extent, these limitations are due to the fact that insulating layers also function as the means by which the laminations are held together to form an integrated assembly. In addition to varnish, materials such as epoxy and ceramic cements have been used to insulate and secure together the metal laminations. While such materials are satisfactory in many areas, they fall short of one or more manufacture or performance requirements.

Accordingly, the principal object of the present invention is to produce a laminated magnetic core which constitutes an improvement over cores assembled according to prior-known techniques.

A more particular object of the present invention is to provide a laminated magnetic core which avoids the use of conventional insulating cements and is constructed in such a manner that the eddy current losses are reduced to a minimum while hysteresis loss, being a bulk property of the metal laminates, is maintained at a satisfactory level and is not increased by the manner in which the core is manufactured.

A further object is to provide a novel method of manufacturing a new and improved magnetic core suitable for use in a variety of electrical and electronic devices, including, but not limited to, motors, generators, and transformers.

In the attainment of these objects, the invention involves the use of a silicon oxide coating which functions to insulate adjacent lamellae, the latter being held together by a braze between the silicon oxide layers. The manner in which the lamellae are coated with silicon oxide before being assembled together in a firm stack by brazing is variable, thereby permitting a method of fabrication which is not limited to a particular form of coating apparatus.

Other objects and many of the attendant advantages of the present invention will become more readily apparent as reference is had to the following detailed specification when considered together with the accompanying drawings wherein.

Figure 1:
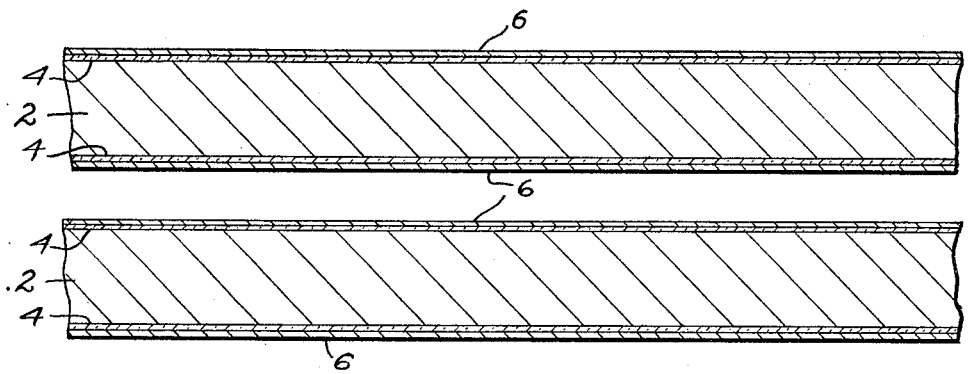
FIG. 1 illustrates two separate coated lamellae according to a preferred embodiment of the present invention.
Figure 2:
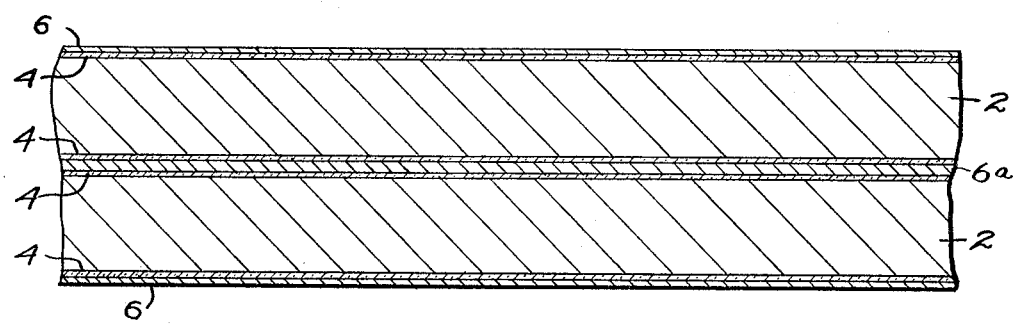
FIG. 2 illustrates the construction resulting from bonding together of the two lamellae of FIG. 1.

With reference to FIGS. 1 and 2, the invention will now be described according to the preferred method of manufacture, significant stages thereof being separately enumerated hereinafter.

(1) At the outset, it is necessary to provide a plurality of sheets or lamellae 2 fabricated from a suitable magnetic alloy already known for optimum magnetic properties, as, for example, iron–4% silicon alloy. These metallic sheets are punched to the desired cross-sectional configuration of the assembled core. Since their surfaces are generally pitted and burrs may be present at the cut edges, and also because they may not always be quite flat, the sheets are lapped in a conventional lapping machine. Preferably, they are lapped until their broad surfaces have a fine matt finish. Lapping to a fine matt finish renders the surfaces more suitable for receiving smooth, continuous coatings of silicon monoxide. After lapping, the sheets are cleaned, preferably by ultrasonic agitation in a solvent bath. It is preferred that they be kept immersed in the solvent bath until just prior to receiving the silicon monoxide coating.

(2) The next stage involves application of a silicon monoxide coating 4 to both of the broad surfaces of each metallic sheet. This may be done by various evaporation techniques, none of which are novel. Thus, evaporation may be accomplished from crucibles, flat strip heaters, or spiral heaters. The latter are preferred. Nevertheless, each form of source of silicon monoxide is satisfactory, albeit they enter as different variables in the function of required silicon monoxide thickness. Also variables of the same function are: (1) source-to-specimen distance, (2) temperature of source, (3) time of evaporation, and (4) directionality of the evaporating element. Additional variables may be introduced by causing the specimens to move, as, for example, in a planetary motion around the source of silicon monoxide. Accordingly, it is to be appreciated that conditions for the silicon monoxide evaporation step are not fixed; however, certain selected conditions which give rise to a required silicon monoxide thickness can be and are presented herinafter as an example of the techniques involved in the present invention. The preferred thickness for each silicon monoxide layer is in the range of 4,000 to 8,000 Angstrom units. As a general rule, where both sides of a metallic sheet are to be given a silicon monoxide coating, the coatings are applied sequentially. However, it is contemplated that both sides may be coated simultaneously.

(3) Following application thereto of the layers of silicon monoxide, each metal sheet is heat treated to obtain optimum properties. Heat treatment is accomplished by heating the sheets in air or an oxygen atmosphere to a temperature of at least about approximately 400° C. and preferably in the range of 400–800° C. for a time preferably in the range of approximately 15–60 minutes. Thirty minutes is believed to be the optimum heating time.

(4) Upon conclusion of the heat treatment operation, the individual sheets are provided with a thin coating of brazing material 6 over each layer of silicon monoxide. It is essential that the brazing material be applied in relatively thin coatings in order to maintain maximum density of magnetic iron alloy in the finished stack. It has been found that the most convenient way of accomplishing this has been by vacuum evaporation. At this point, it is to be noted that any metal or alloy of metal may be used as a brazing material providing it fulfills the main function of producing a tightly brazed joint between the lamellae and that the melting point of the brazing material is sufficiently high to allow the stack to be reheated to given temperatures. However, it is preferred to employ as brazing materials the classical silver solder alloys. Particularly suitable are the Ag–Cu–Cd and Ag–Cu–Zn solder alloys. These brazing materials may be applied either as preformed alloys or by separate evaporation of their elemental components. Preferably, the total thickness of each coating of brazing material is approximately 5,000 Angstrom units.

(5) The final stage of the method involves creation of a braze bond between successive sheets arranged in an aligned stack by heating the stack according to a predetermined temperature-time schedule. Preferably, this bonding is accomplished in a non-oxidizing atmosphere, e.g., 5% hydrogen/95% nitrogen. In general, the brazing temperature will be about 800–850° C., and the overall heating period will be about 2 minutes. The brazing temperature and time are dependent upon the particular brazing material which is used. Thus, where the elemental components of the brazing material are separately evaporated onto the metallic sheets, the temperature of the final brazing operation must be sufficient not only to allow the brazing material to make a suitable bond, but also to liquefy to the extent necessary to actually create the braze alloy. The individual sheets are held together in a stack by a suitable jig and also are weighted during the brazing operation, thereby assuring a strong complete bond between the individual sheets.

In the light of the foregoing outline of the preferred form of the invention, two specific examples will now be provided, the first example representative of the preferred form of the invention.

*Example I*

A plurality of sheets of identical configuration are punched from stock Fe–4% Si sheets having a thickness of .010 inch. The individual lamellae are then lapped in a Crane Lapmaster using No. 1600 grit for 30 minutes on each side. This treatment leaves the broad surfaces of the sheets with a fine matt finish. Thereafter, the individual lapped sheets are cleaned by ultrasonic agitation in a solvent bath. After cleaning, each sheet in turn is provided with a coating of silicon monoxide.

Each sheet in turn is placed in a standard evaporator, e.g., High Vacuum Equipment Corporation, Model G–71–1. Each sheet is mounted with one side exposed to three separate, electrically energized, spiral tungsten sources each having ten turns extending over an axial length of 0.75 inch and with an outside diameter of approximately 0.125 inch. The source-to-specimen distance is 10 inches, and each tungsten source is loaded with 0.25 gram of optical grade silicon monoxide. The loads on the three sources are evaporated to completion, producing a thickness of approximately 5,000 Angstrom units on the exposed side of the metal sheet. Then the procedure is repeated for the opposite side of each sheet.

Thereafter, the metal sheets are placed in quartz trays and each tray is then heated for 30 minutes at a temperature of 450° C. in air.

Then the sheets are transferred to another conventional evaporator where each side in turn is exposed to deposition of Ag, Cu, and Cd in the proportions 1:5:4. This is acheived by placing 100 mgms. of Ag, 500 mgms. of Cu, and 400 mgms. of Cd into separate evaporation crucibles and then evaporating them to completion sequentially in the order named. The three components deposit onto the exposed silicon monoxide coating in separate layers, but in the same proportions. The total thickness of the three brazing components is approximately 5,000 Angstrom units.

Thereafter, the sheets are arranged in a stack in a suitable jig mounted in a quartz tube, and weights are applied to the top of the stack so as to press the sheets together. An atmosphere of 5% $H_2$–95% $N_2$ is fed into the tube and the stack is heated by means of an RF heater. The temperature within the tube is elevated at a substantially uniform rate to a temperature of approximately 850° C. within a time period of 140 seconds, maintained at that temperature for approximately 10 seconds, and thereafter reduced at substantially the same uniform rate to room temperature.

The resulting composition is as shown in FIG. 2, comprising individual metallic alloy sheets 2 having silicon monoxide layers 4 on both sides and an Ag–Cu–Cd braze 6a between confronting silicon monoxide layers of successive metal sheets.

*Example II*

Figure 3:
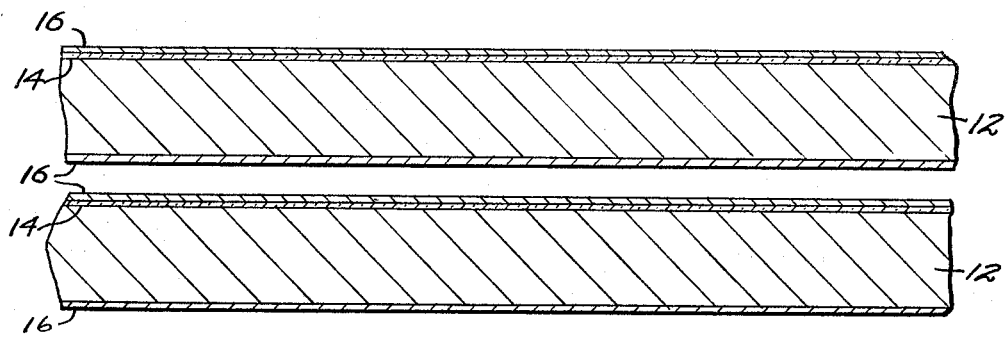
FIG. 3 is a view similar to FIG. 1 illustrating a second form of the invention.

This example applies to a second form of the invention which is shown in FIG. 3. In this example, the same steps are followed as in Example I, except that each metal sheet 12 is provided with only a single layer 14 of silicon monoxide. However, each sheet is still provided with two coatings 16 of braze material, one coating of braze material applied over the single layer of silicon monoxide and the other coating applied directly to the opposite face of the metallic sheet. The sheets are stacked in layers with the silicon monoxide coatings all facing the same direction. The finished core will consist in turn of a metallic sheet, a layer of silicon monoxide, a braze, a metallic sheet, a layer of silicon monoxide, a braze, a metallic sheet, etc.

Heat treatment of the silicon monoxide coatings accomplishes two things: (1) an increase in sheet resistance of the silicon monoxide layer and (2) enhanced adherence of the silicon monoxide-iron alloy interface. The first function of heat treatment is believed to be obtained by the formation of $SiO_2$ at the surface. According to Holland, Vacuum Deposition of Thin Films, page 488, published by Wiley, silicon monoxide layers can be oxidized to $SiO_2$ by heating in air at about 400–500° C., but complete oxidation cannot be obtained for layers above 1,000 Angstrom units thick. This has been confirmed by attempts to heat pieces of silicon monoxide inside a platinum tube in an oxygen atmosphere. Under these conditions, only a thin, iridescent, outer layer of $SiO_2$ was formed at temperatures as high as 1200° C. It is to be noted that the increase in sheet resistance is important but not critical since the SiO has more than adequate electrical resistance for the purpose of reducing eddy current losses. However, the second function of heat treatment, enhanced adherence at the silicon monoxide-iron alloy interface, is extremely important since the final mechanical integrity of the core is dependent on the strength of this interface.

It has been determined that silicon monoxide evaporated onto the sheets but not heat treated will spall from the surface after several hours at room temperature and can be removed by gentle abrasion almost immediately after evaporation. On the other hand, heat treated lamellae can be vigorously abraded and left at room temperature indefinitely without loss of SiO from the surface. This increased adherence is believed to be due to or enhanced by a reaction of the following form:

$$SiO + Fe + O_2 \rightarrow FeSiO_3$$

Of course, this reaction is simplified. It is most likely, for instance, that the silicon in the iron-silicon alloy would play some part in the reaction. Nevertheless, the condition of the specimen after heat treatment can be described as a sheet of iron-silicon alloy covered by a relatively thin layer of $FeSiO_3$, a heavier layer of SiO over the $FeSiO_3$, and a relatively thin $SiO_2$ layer on the outer face of the SiO layer. It is well known that a series of compounds of the form $Fe_xSi_yO_2$ do exist; hence, the choice of $FeSiO_3$ merely serves as an example for the purpose of this discussion, it being understood that other Fe–Si–O compounds may be formed during the heat treatment.

Although the preferred time for heat treatment is 30 minutes, it is to be understood that the heating time is not critical and that time periods of up to 4 hours for temperatures in the range of 400–800° C. have been used with success. These longer times presuppose that the sheets are completely coated with silicon monoxide. However, if there are discontinuities in the SiO film, oxidation of the underlying alloy sheets will occur with several serious consequences. For one thing, the volume of iron oxide created at any one point causes an eruption on the surface, creating a high spot which does not allow intimate contact with neighboring lamellae. Secondly, the iron oxide which is formed will not be adherent to the underlying iron alloy and, therefore, can spall from the surface so as to create an uninsulated area and also interfere with the intimacy of contact between neighboring sheets. Thirdly, if the lamellae are subsequently subjected to more elevated temperatures, as, for example, during the brazing operation, the iron oxide will react with the silicon monoxide to form an oxide complex which will not be adherent to the substrate. Accordingly, it is preferred to maintain the heat treatment schedule to around 30 minutes at a temperature of 400–800° C. since under these conditions small pin holes in the silicon monoxide layer will allow the iron alloy substrate to oxidize only very slightly but will not allow reaction between the silicon monoxide and any iron oxide which is formed. Such small localized areas of iron alloy oxidation will not have a deleterious effect on the final stack configuration. At this point, it is to be appreciated that the pin hole-type defect mentioned hereinabove is due primarily to insufficient surface preparation prior to silicon monoxide evaporation. Pits and depressions in the lamellae tend to have a self-shadowing effect on the depositing silicon monoxide, causing an area associated with a pit not to be coated with silicon monoxide. Hence, proper preparation of the magnetic sheet material is essential in order to obtain maximum benefit from the invention.

Notwithstanding the two examples set forth hereinabove, it is to be understood that the invention is subject to considerable variation. Thus, the thickness of the metal plates is not critical but may be varied according to the particular end use of the core. For small electrical devices such as servo motors, the metal sheets generally will have a thickness in the range of .005 to .040 inch. However, they may be thicker. Similarly, the metal plates may be made of any one of a variety of magnetic materials heretofore employed for magnetic cores. It is to be observed also that the particular shape of the metal sheets is not critical. Thus, the metal sheets may be circular, rectangular, triangular, U-shaped, H-shaped, etc., depending upon the proposed end use of the magnetic core. The thickness of the silicon monoxide layers and the braze material layers also may be varied within reasonable limits, dependent upon the particular electrical specifications which must be met.

It is to be understood also that it is not necessary to apply braze material to both sides of each metallic sheet or directly to the layers of silicon monoxide before the sheets are arranged in a stack. Thus, it is permissible to prepare lamellae wherein each metal sheet has a coating of silicon monoxide on one surface and a coating of braze material on the opposite surface, whereby when the sheets are arranged in a stack and thereafter subjected to elevated heating, the braze material on one sheet will bond to the silicon monoxide layer on the next sheet. The resulting stack will comprise a sheet of metal, a silicon monoxide coating, braze material, a sheet of metal, a layer of silicon monoxide, braze material, etc.

Using the procedures outlined hereinabove, it is possible to attain laminated magnetic cores having minimum eddy current losses, minimum hysteresis losses, mechanical integrity of a level such that the cores will withstand reheating to elevated temperatures and can be subjected to machining and grinding to final dimensions without delamination. A significant advantage of the invention is that it eliminates the use of such troublesome materials as varnish, ceramic and plastic cements for holding the stacks together, and replaces them with a metallic alloy having superior strength and temperature characteristics. Also an advantage is the fact that the individual steps of the method for making the cores are suited for mass production techniques. Moreover, the method is feasible economically since the materials and apparatus that are required are well known and commercially available.

Other advantages of the product and method aspects of the present invention will be obvious to persons skilled in the art. Similarly, it will be obvious to persons skilled in the art that the invention is susceptible to many changes and variations in addition to those herein described without departing from the principles herein set forth. Accordingly, this invention is not to be limited except by the following claims.

I claim:
1. A bonded laminated magnetic core comprising a plurality of magnetic iron alloy lamellae each having an insulating coating of silicon monoxide and silicon dioxide bonded thereto by an iron silicate, said lamellae held together by intervening layers of a non-magnetic metal braze bonding material.

2. A bonded laminated magnetic core comprising a series of flat sheets of a magnetic iron-silicon alloy each with a coating of silicon monoxide on at least one surface thereof, and layers of a non-magnetic braze material interposed between and bonding together successive ones of said sheets, each layer of braze bonding material being directly bonded to one of said silicon monoxide coatings, each said layer of non-magnetic braze bonding material comprising silver, copper and a member of the class consisting of cadmium and zinc.

3. A bonded laminated magnetic core characterized by low eddy current and hysteresis losses, said core consisting of a plurality of alternately occurring lamellae of a magnetic iron alloy and a non-magnetic metal braze bonding material, each lamella of iron alloy insulated from an adjacent lamella of braze bonding material by an adherent film of silicon monoxide.

4. A laminated magnetic core as defined by claim 3 wherein said iron alloy comprises iron and silicon.

5. A bonded laminated magnetic core as defined by claim 3 wherein said lamellae of magnetic iron alloy have thicknesses in the range of approximately .005 inch to approximately .040 inch, said lamellae of braze bonding material have thicknesses in the order of 5,000 Angstrom units, and said silicon monoxide films have thicknesses in the range of 4,000 to 8,000 Angstrom units.

6. The method of fabricating a laminated magnetic core comprising the steps of providing a plurality of sheets of magnetic alloy material coated with thin layers of silicon oxide consisting substantially of silicon monoxide, coating said silicon oxide layers with a brazing material, stacking said sheets together, and applying heat sufficient to braze said sheets together whereby to form a single integrated magnetic core.

7. The method of claim 1 wherein said sheets are heated in a non-oxidizing atmosphere.

8. The method of claim 1 wherein each sheet has a silicon oxide coating on opposite sides thereof.

9. The method of claim 1 wherein each sheet has a silicon oxide coating on only one side thereof.

10. The method of claim 9 wherein said brazing material is applied to each sheet on a side opposite to said one side.

11. Method of claim 1 wherein said brazing material as applied is an alloy comprising silver, copper and a member of the group consisting of cadmium and zinc.

12. Method of claim 1 wherein said brazing material includes a plurality of metals in predetermined proportions and further wherein said metals are applied sequentially to each silicon oxide layer.

13. Method of claim 1 further including the step of heat treating said sheets before application of said brazing material, whereby to improve adherence thereto of said silicon oxide coatings.

14. Method of claim 1 wherein said brazing material has a thickness in the order of 5,000 Angstrom units.

15. Method of claim 1 wherein said sheets are made of an iron-silicon alloy.

16. The method of fabricating a laminated magnetic core comprising the steps of providing a plurality of sheets of magnetic material, lapping and cleaning said sheets, coating at least one side of each sheet with a layer of silicon oxide consisting substantially of silicon monoxide, heating said sheets at an elevated temperature for a period of time sufficient to enhance adherence of said silicon oxide layers to said sheets, applying a coating of brazing material over each of said layers of silicon oxide, stacking said sheets together, and heating the stack of sheets sufficiently to braze them together whereby to form an integrated magnetic core of high mechanical integrity.

17. The method of claim 16 wherein each silicon oxide layer has a thickness in the range of 4,000–8,000 Angstrom units.

18. The method of claim 16 wherein each coating of brazing material has a thickness of approximately 5,000 Angstrom units.

19. The method of claim 16 wherein said elevated temperature is in the range of 400–800° C.

20. The method of fabricating a laminated magnetic core comprising the steps of providing a plurality of sheets of magnetic alloy material, lapping and cleaning said sheets, coating at least one side of each sheet with a layer of silicon oxide consisting substantially of silicon monoxide, heating said sheets at a temperature in the range of 400–800° C. for a period of time in the range of approximately 30 minutes to approximately four hours whereby to enhance adherence of said silicon oxide layers to said sheets, applying a coating of brazing material over each of said layers of silicon oxide, stacking said sheets together, and heating the stack of sheets sufficiently to braze them together whereby to form an integrated magnetic core of high mechanical integrity.

References Cited by the Examiner

UNITED STATES PATENTS

| | | | |
|---|---|---|---|
| 2,394,047 | 2/1946 | Elsey et al. | 336—219 |
| 2,479,325 | 8/1949 | Domenico | 29—155.61 |
| 2,561,462 | 7/1951 | Compton et al. | 336—219 |
| 2,746,140 | 5/1956 | Belser | 29—472.7 |
| 2,803,570 | 8/1957 | Hespenheide | 336—219 |
| 2,984,825 | 5/1961 | Fuller et al. | 317—158 XR |
| 3,032,869 | 5/1962 | Hochman | 29—472.7 |
| 3,094,650 | 6/1963 | Riegert | 117—106 XR |
| 3,128,545 | 4/1964 | Cooper | 29—155.5 XR |
| 3,158,502 | 11/1964 | Bremer | 117—106 XR |

OTHER REFERENCES

Thin Film Insulation in Super Conducting Systems, page 94, IBM Technical Disclosure Bulletin, vol. 4, No. 7, December 1961, Copy Group 270, 317-158.

JOHN F. CAMPBELL, *Primary Examiner.*

FRANK E. BAILEY, WHITMORE A. WILTZ, H. D. WHITEHEAD, R. W. CHURCH, *Examiners.*

UNITED STATES PATENT OFFICE
CERTIFICATE OF CORRECTION

Patent No. 3,271,718                                   September 6, 1966

Beverley A. Shaw

It is hereby certified that error appears in the above numbered patent requiring correction and that the said Letters Patent should read as corrected below.

Column 6, lines 67, 69, and 71, column 7, lines 1, 4, 8, 12 and 14, for claim reference numeral "1" read -- 6 --.

Signed and sealed this 29th day of August 1967.

(SEAL)
Attest:

ERNEST W. SWIDER                              EDWARD J. BRENNER
Attesting Officer                                   Commissioner of Patents